June 14, 1955  T. W. MOORE  2,710,927
VOLTAGE REGULATING SYSTEM
Filed Aug. 29, 1949  4 Sheets-Sheet 1

INVENTOR
Thomas W. Moore
BY
Marechal & Biebel
ATTORNEYS

June 14, 1955      T. W. MOORE      2,710,927
VOLTAGE REGULATING SYSTEM

Filed Aug. 29, 1949      4 Sheets-Sheet 2

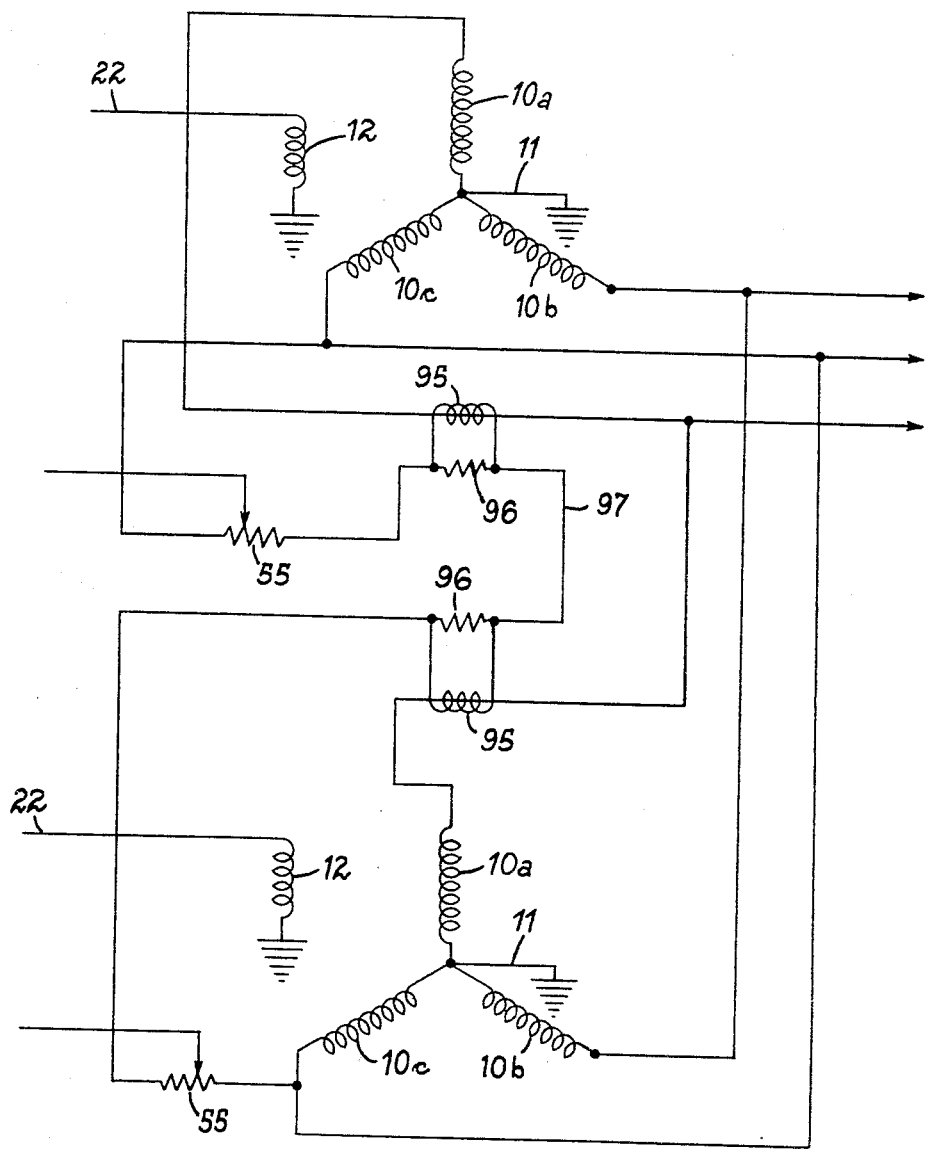

United States Patent Office 2,710,927
Patented June 14, 1955

2,710,927

VOLTAGE REGULATING SYSTEM

Thomas W. Moore, Dayton, Ohio, assignor, by mesne assignments, to American Machine & Foundry Company, New York, N. Y., a corporation of New Jersey Application August 29, 1949, Serial No. 112,924

12 Claims. (Cl. 307—57)

This invention relates to voltage regulators and more particularly to a system for regulating the output voltage of an alternator.

The invention provides a regulating system for an alternator, such as a polyphase alternator, having a field winding adapted to be supplied from a source of alternating current such as an auxiliary exciter alternator through thermionic rectifier means which is suitably controlled to provide a flow of direct current to the field of the main alternator which is regulated to maintain a desired output voltage on the main alternator. The rectifier means includes an anode which is connected to the auxiliary alternator as a source, and a control grid, the grid being supplied with a control potential embodying a plurality of components. There is an alternating current potential component which is in quadrature relation with the anode voltage and which is preferably derived from the same source, thereby assuring continuous coordinated relationship. There is also produced an alternating current voltage varying in direct relation with variations in the output voltage of the main alternator. This varying alternating current voltage is converted into a similarly varying direct current voltage. Preferably two direct current components are produced, one of substantially constant value, and the other being amplified and varying in the same manner as the variations in the output voltage of the main alternator. These two potential components are superimposed on the alternating current potential in opposition to each other to provide a composite control potential which is applied to the grids of the rectifier means to regulate the value of the current supplied to the main field winding in such manner as to maintain and regulate the output voltage of the main alternator to a desired value.

The invention also provides for the parallel operation of a plurality of alternators utilizing such regulating system. An equalizer bus connects the alternators and the flow through such bus is used to produce an additional control potential varying in direction and amount with the flow of equalizing current. This additional potential is further superimposed on the control grids of the rectifier means in such manner as to regulate the flow of current in the field of the main alternator associated therewith, to cause such alternator to assume its proper share of the load.

It is accordingly the object of the invention to provide such a regulating system which is simple, reliable and accurate in operation, and which provides for maintaining the output voltage of the alternator within a narrow range under substantial changes in load.

It is also an object to provide such a system by means of which a plurality of alternators may be operated in parallel with a predetermined and maintained division of the load therebetween.

Other objects and advantages will be apparent from the following description, the accompanying drawings and the appended claims.

In the drawing,

Fig. 4 is a vector diagram showing conditions during the parallel operation of alternators in accordance with the present invention;

Fig. 5 is a diagrammatic view showing a connection of two alternators arranged for parallel operation in accordance with the present invention.

Figure 1:
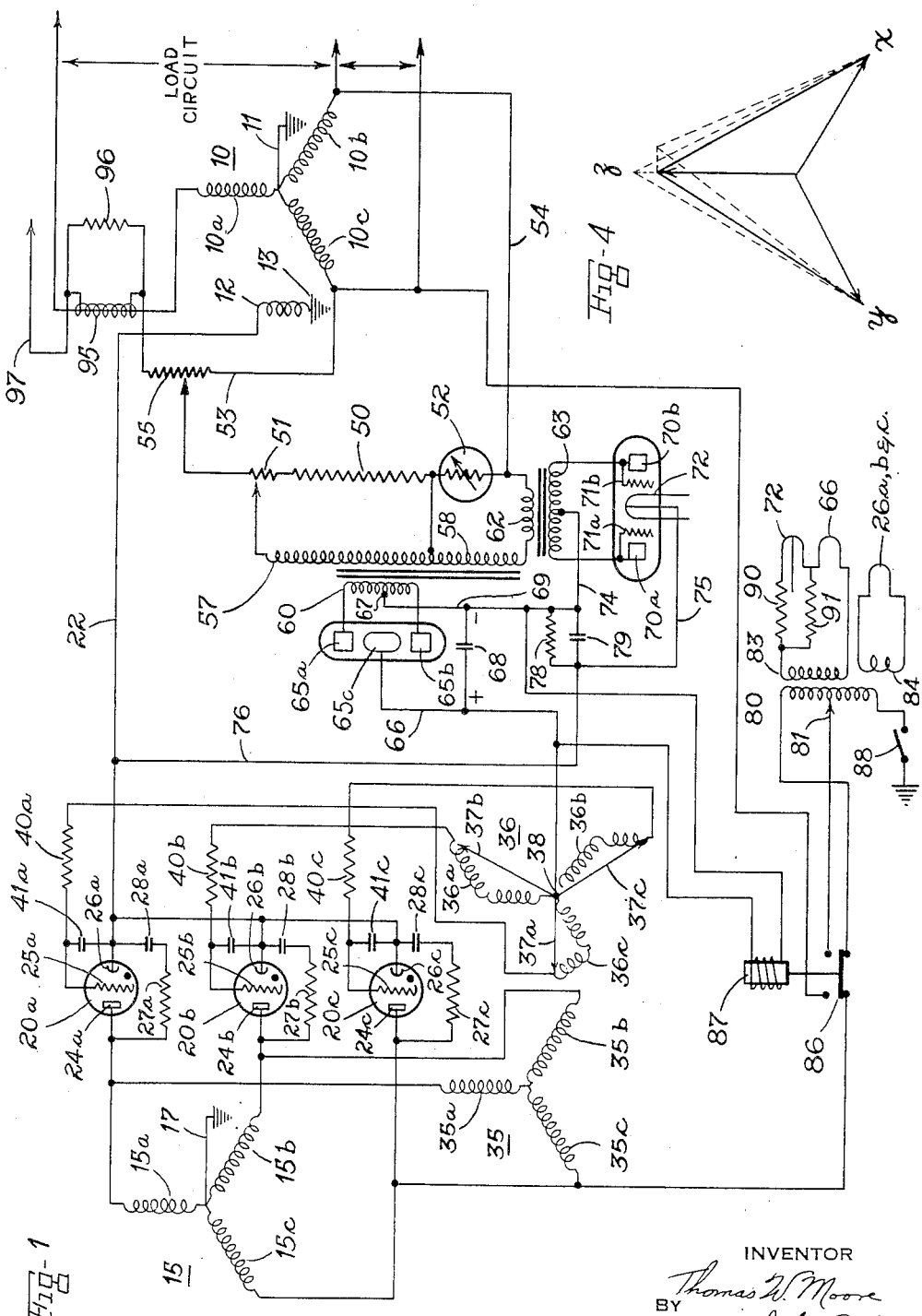
Fig. 1 is a diagrammatic view showing a regulating system embodying the present invention.

Referring to the drawings which disclose preferred embodiments of the invention, the main alternator is shown at 10 as being three phase and having a star connection with its center point grounded at 11 and the three legs 10a, 10b and 10c. The field or exciting winding of the alternator is shown at 12, one side thereof being grounded as shown at 13.

The exciter alternator is indicated at 15 as also being three phase and having three legs 15a, 15b and 15c, being preferably of the permanent magnet type so that it does not require any exciter field winding. The center point is grounded as shown at 17.

The auxiliary alternator 15 serves as a source of alternating current, and rectifier means comprising three thermionic tubes 20a, 20b and 20c are included in the output of the auxiliary alternator to provide for converting the alternating current output thereof into a controlled flow of direct current to be supplied through line 22 in the field winding 12 of main alternator 10. Each of the rectifier tubes includes an anode 24a, 24b and 24c, a grid 25a, 25b, and 25c and a hot cathode 26a, 26b and 26c. It will be evident from the diagram that the several cathodes are all connected to line 22 and that the flow of current through this line 22 will be unidirectional and under control of the several grids 25a, 25b and 25c. Suitable surge absorbing or buffering resistors 27a, 27b and 27c and condensers 28a, 28b, and 28c are likewise included in the circuit between the anodes and cathodes in the manner shown. A suitable tube for use as a rectifier is the C6P.

Means are provided for deriving a voltage for application to the control grids of the rectifier tubes of the same frequency as the source 15 but in predetermined out-of-phase relationship therewith, preferably in quadrature relation thereto. For this purpose a three phase biasing transformer is provided having a primary 35 with each of its three legs 35a, 35b and 35c connected respectively to the corresponding phases of the source 15. The secondary 36 of the biasing transformer is provided with pairs of coils 36a, 36b and 36c in each of its legs in proper phase relation to each other to produce voltage vectors 37b, 37c, and 37a which are in quadrature relation with the corresponding voltages of the source 15. The secondary coils are connected at a common point 38, and at their other ends are connected through resistors 40a, 40b and 40c and condensers 41a, 41b and 41c, respectively, to the several control grids 25a, 25b and 25c. The voltages thus applied to the control grids of the rectifier tubes being in 90° or quadrature phase relation with respect to the voltage of the source which is applied to the anodes of the tubes, provides an essentially linear time base for the initiation of the flow of current to the cathodes and hence to the field winding 12 of the main alternator and other control potentials are applied of such nature as to control the point in the cycle at which the rectifier tubes become conducting and permit a flow of unidirectional current. Such additional potentials are produced in relation to the output voltage of the main alternator and suitably applied to the common point 38 of the secondary of the biasing transformer to thereby raise or lower its entire potential in relation to the cathodes 26, and thus to regulate the flow of current to the main field winding to a desired value.

In order to derive such additional control potentials, means are provided which is responsive to the alternating current voltage produced in the output circuit of the main alternator 10. For this purpose a combined resistor composed of a substantially fixed portion 50 including an adjustable portion 51, and a non-linear portion 52, is connected across one phase of the output circuit of the alternator 10 by means of lines 53 and 54. An auxiliary resistor 55 is also included, the function of which has to do with the operation of a plurality of the main alternators in parallel, as will be hereinafter described. The resistor 51 is merely for adjustment purposes and connection is made from the combined resistors 50, 51 to the primary portion 57 of a transformer having a second primary portion 58 of relatively low voltage, and a secondary winding 60. The primary portion 58 is connected in series with the non-linear resistance 52 and with the primary of transformer 62 having a secondary 63. This transformer 62, 63 is a step-up transformer having a ratio of 1 to 6 for example providing for an amplified voltage in its secondary. The non-linear resistance 52 may be of suitable character such as to maintain substantially constant current flow therethrough, a suitable resistor for this purpose being a 3A10 Amperite. As an example, the primary winding 57 may have a voltage of 198 volts, primary 58 a voltage of 10 volts and secondary 60 a voltage of about 50 volts.

The purpose of the circuit just described is to separate the alternating current voltage of the output circuit of the main alternator 10 into two components, namely, a substantially constant voltage portion as developed across resistors 50 and 51 and as supplied to the primary winding 57, and similarly produced in the secondary transformer winding 60. The other portion is a variable alternating current potential which is produced across the non-linear resistor 52, the resistance of which changes rapidly in such manner as to tend to maintain a constant flow of current through the circuit. As a result the voltage across the non-linear resistor 52 will change markedly with changes in the output voltage of the alternator, and this will be reflected in a change in the voltage of primary winding 62, producing a similar but magnified change of voltage in secondary winding 63. The purpose of the relatively small voltage winding 58 is to provide a voltage for balancing out the linear component of the voltage appearing across non-linear resistance 52. That is, it serves to bring the non-linear resistance to a condition somewhat above the knee of its characteristic curve where the curve is substantially flat, and such that a larger differential voltage is developed for control purposes than at any point below the knee.

The system additionally provides for converting both the constant and varying alternating current voltages into two direct current potentials, the first being substantially constant, and the second being variable in direct relation to the variations in the alternating current voltage. The constant direct current component is developed by connecting the two ends of the secondary winding 60 to anodes 65a and 65b in a tube such as a 12H6 having interconnected hot cathodes 65c. A connection is made at the center point 67 of transformer 60 and a filter condenser 68 couples this center point to the cathode 65c. A direct connection is made by line 66 from cathode 65c to the common point 38 of the biasing transformer 36, thereby supplying the uniform direct current potential of positive sign to raise the potential of the entire biasing system, as applied to the grids of the rectifier tubes.

The variable alternating current potential from secondary winding 63 is supplied to the anodes 70a and 70b of a tube such as a 3A5 having control grids 71a and 71b directly connected to the anodes and a hot cathode 72. The mid-point of the secondary winding 63 is connected by line 74 to line 69, while the circuit from cathode 72 is completed through lines 75 and 76 to the common cathode connection to the cathodes 26a, 26b, and 26c of the rectifiers. Since this applies a positive bias to the cathodes of the rectifiers, it is equivalent to applying a negative bias to the grids and hence this varying direct current potential is made effective to oppose the constant direct current potential, and the combined direct current potentials are superimposed on the alternating current biasing or quadrature potential. The values of the several biasing potentials are preferably such that the grid potentials of the rectifier tubes remain positive at all times in the absence of the negative direct current potential, that is, the positive direct current bias is such that when superimposed on the alternating current value, the resultant is positive at all times. However when the negative direct current potential is added, proper control of the rectifier tubes is obtained. A filter network including resistor 78 and condenser 79 is connected between line 74 and cathode 72.

A circuit is also shown for supplying the current to heat the cathodes of the several tubes comprising a transformer having a primary 80 with a tap 81 where for example the output of main alternator is 120 volts per phase leg, 400 cycles and the output of the auxiliary alternator is 250 volts per phase leg, also 400 cycles. Two secondary windings 83, 84 of different voltage are provided. The transformer is arranged with a relay switch 86 operated by solenoid 87 in such manner that at the beginning of the operation of the system, solenoid 87 is not energized and the lower contacts of the relay switch are closed thus supplying the primary of the transformer 80 through its high voltage connection. However when the system is in operation and there is a control voltage across condenser 68, solenoid 87 becomes energized and closes its upper switch contacts to supply a flow of current through the lower voltage tap 81 of the primary winding from one phase of the main alternator 10. A switch 88 may likewise be provided to deenergize the transformer during the initial acceleration period of the alternators.

Because the several tubes require different voltages, separate secondary windings are used, winding 83 supplying the cathode 72 through resistor 90, and the cathode 65c through a series circuit in parallel with another resistor 91. Preferably these two cathode circuits are connected in series so that in the event of failure of the negative bias produced by tube 70—72, the positive bias produced in tube 65c will be deenergized also. It will also be noted that in the event of an open circuit in the non-linear resistance 52 full bias is applied to the tube 70—72 which thereupon develops full negative bias and applies the same to the grids of the rectifiers, cutting off the flow of current to the field winding 12 completely.

In operation, and assuming all cathodes to be heated and functioning, the output voltage of the main alternator is applied to the combined resistor 50—51 and to the non-linear resistor 52. This results in segregating a substantially uniform alternating current potential which is applied to primary 57, transformed into the secondary 60, and converted into a substantially fixed direct current potential by means of tube 65. The variations in the output voltage of the main alternator are segregated as a varying alternating current potential, suitably amplified in transformer 62, 63 and converted into a variable direct current potential by means of tube 70—72. This potential is combined in opposition with the substantially constant direct current potential from tube 65, and the resultant applied to the central point 38 of the secondary of the biasing transformer to thereby shift the entire potential of the several grids 25a, 25b and 25c relative to the cathodes of the rectifier tubes. In this way a composite control potential is developed which regulates the point in the cycle at which each of the rectifier tubes becomes conductive, and thus the flow of unidirectional current through the field 12 of the alternator is controlled, providing for maintaining a desired output voltage on the alternator.

In order to provide for operation of a plurality of alternators in parallel, in accordance with the connections as shown in Fig. 5 where two such alternators are arranged for parallel operation in accordance with the present invention, one of the legs of the output circuit of alternator 10 is provided with a current transformer 95 shunted by resistance 96, and connected to equalizer line 97, to which the other alternator or alternators are similarly connected. A potential is thus developed by the current transformer 95 which varies in direction and amount with the flow of current in the equalizer line, and this potential is superimposed upon the combined resistors 50, 51 and 52 in such manner and with the proper phase relation to change the alternating current voltage applied thereto, depending upon the flow of such equalizing current. This additional alternating current potential is converted to a direct current potential in the manner already described, and thus further changes the final potentials applied to the grids 25a, 25b and 25c so as to cause each alternator in the system to increase or decrease its voltage as required to assume its proper share of the reactive load. The share of the reactive load assumed by each such alternator may be predetermined and regulated by the setting of adjustable resistor 55.

As a specific example of values of resistance and capacity which have been found siutable for use in a system such as that described, the following table of values is set forth.

| Resistor | Value in ohms |
| --- | --- |
| 27a, 27b, 27c | 200 |
| 40a, 40b, 40c | 0.3 megohm |
| 50 | 500 |
| 51 | 150 |
| 55 | 25 |
| 78 | 30,000 |
| 90 | 100 |
| 91 | 250 |
| 96 | 25 |

| Condenser | Value in microfarads |
| --- | --- |
| 28a, 28b, 28c | 0.5 |
| 41a, 41b, 41c | .0005 |
| 68 | 2.0 |
| 79 | .25 |

Figure 2:
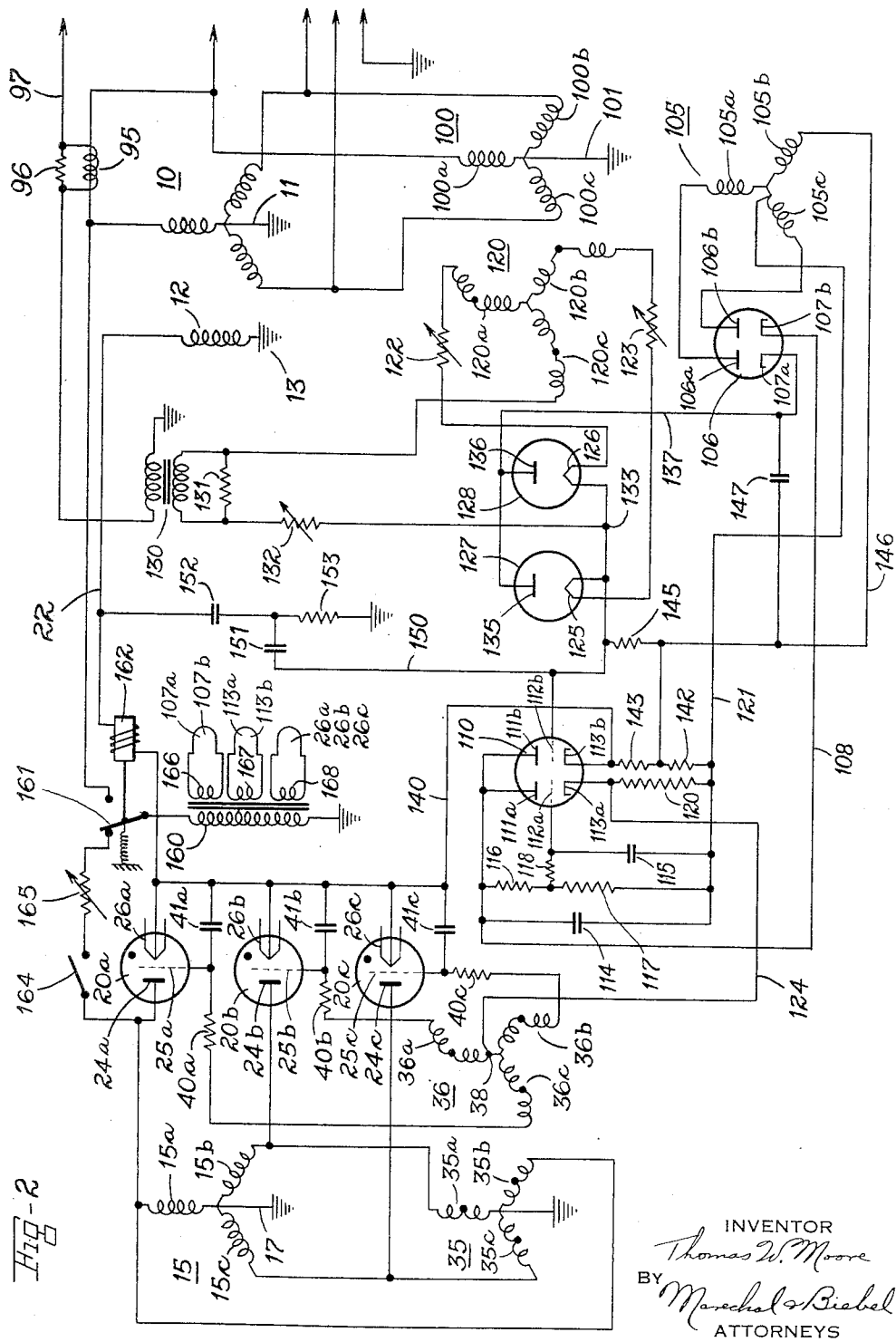
Fig. 2 is a diagrammatic view of a modified form of such regulating system.

Fig. 2 shows a modified circuit diagram for a regulating system in which different means are utilized for developing the constant and variable direct current potentials. All parts having the same reference numeral are similar to those described above, and the discussion will be directed primarily to those parts of the system which are different.

In order to obtain alternating current voltages of the desired values, 3-phase transformer 100 is connected to the output circuit to the main alternator 10, having legs 100a, 100b and 100c, the center point being grounded as shown at 101. This transformer has two secondaries, one of which is indicated at 105, providing for supplying alternating current to a plate supply rectifier tube 106. Two of the phase legs 105a and 105b are connected together at their center point while the other phase leg 105c is separate, and connections are made from legs 105a and 105c to the anodes 106a and 106b. The tube has hot cathodes 107a and 107b, connection being made from the latter through line 108 to the anodes 111a and 111b of a tube 110 operating as a cathode follower and amplifier, thereby providing a plate voltage for such tube. A suitable tube for use as rectifier 106 is a 6AL5 and for the cathode follower tube 110, a 7F8. The tube 110 has two anodes 111a and 111b, two grids 112a and 112b, and two hot cathodes 113a and 113b.

A grid biasing network including condensers 114 and 115, and resistors 116, 117 and 118, is connected as shown to the anode 111a, the grid 112a and the cathode 113a of tube 110. The return circuit to the leg 105c of the transformer is completed through a load balancing resistor 120 and line 121. A direct connection is also made from cathode 113a through line 124 direct to the mid-point 38 of the secondary of the biasing transformer 36. It will be understood that the anode 106b and cathode 107b provide a substantially constant direct current potential which is applied to the anode 111a of tube 110. This furnishes a constant direct current potential and the network provides for applying such a potential to the grid 112a that this portion of the tube remains conducting at all times, thus supplying a substantially constant direct current potential to the mid-point 38 of the biasing transformer 36 to apply a high positive biasing potential to the grids of the rectifier tubes 20a, 20b and 20c.

Transformer 100 has another secondary 120 which comprises pairs of coils 120a, 120b and 120c suitably connected to develop phase voltages having approximately a 90° phase relation with the corresponding voltages of the primary and of relatively low value such as about 10 volts. The outer ends of phases 120a and 120b are connected through resistors 122 and 123 respectively to the hot cathodes 125 and 126 of a pair of temperature limited diodes 127 and 128 which function as non-linear resistances. The third leg 120c of the transformer is connected through a coupling transformer 130 in shunt with resistor 131 and in series with a variable resistor 132 to the common point 133 connecting both cathodes 125 and 126. The anodes 135 and 136 are both supplied with a constant source of direct current potential from rectifier tube 106 through its anode 106a and cathode 107a, and the connection 137. A suitable tube for use as the temperature limited diode is X6030. It is also possible to utilize a tube having both temperature sensitive elements in a single envelope, such a tube being an SR1146.

The common connection 133 between the cathodes 125 and 126 of the temperature limited diodes is connected directly to the control grid 112b of the cathode follower and amplifier and controls the flow of direct current from anode 111b to cathode 113b. Cathode 113b is connected directly through line 140 with the cathode circuit of the rectifier tubes 20a, 20b, and 20c, and thus a potential developed therein is made effective to raise the potential of the cathodes of the rectifier tubes, producing an effect equivalent to developing a negative bias on the grids of the rectifier tubes through connection to the common point 38 of the biasing transformer.

A load resistor 142 having a tapped portion 143 to provide proper bias for the grid 112b is connected to the cathode 113b and to the opposite side of the power supply at line 121, and a resistor 145 is connected between the common side of cathodes 125 and 126 and this tap to provide for application of proper bias voltage to grid 112b. Connection is made through line 146 to the leg 105b of the transformer secondary and a suitable filter condenser 147 is connected between this line and cathode 107a of the rectifier tube. A connection is also made through line 150 and a network comprising condensers 151 and 152 and resistor 153 to the supply line 22 in the main field winding 12 in the manner indicated.

The function of this circuit is to stabilize the regulator. Condenser 152 and resistor 153 are so related in their values that the D. C. voltage apearing across 152 follows the envelope of the average voltage across the alternator field without responding to the individual pulses that occur throughout each cycle due to the firing of the individual thyratrons. The net signal is capacitively coupled through condenser 151 back to the grid 112B.

The net result is that any condition tending to produce instability within the control also produces an out-of-phase voltage which counteracts the tendency. Since the signals returned through condenser 151 are purely transient, there is no net steady state effect on the entire system. The values of the circuit elements are selected so that the response time of the control circuit is consistent with the response time of the alternator being controlled. Tests indicate the desirability of using larger values of capacity when used in conjunction with alternators having heavy amortisseur windings and/or considerable inductance in the exciting circuit.

The circuit for the filament or cathode supply of the several tubes is illustrated as including a transformer having a primary 160 which is connected to a single pole double throw relay switch 161 having an operating solenoid 162 in series with the supply line 22 to the main alternator field 12. During start-up and before there is a current flow through solenoid 162, the switch arm is biased to the left and current is supplied from one phase 15a of the exciter alternator through a control switch 164 and adjustable resistor 165 to reduce the current to a proper value. After the current flow to the main field is established, relay switch 161 shifts to its right-hand position and the supply for heating the cathodes is taken from the main alternator. Three separate secondary windings 166, 167 and 168 are shown of suitable voltage characteristics for energizing the cathodes 107a—107b, 111a—111b, and 26a, 26b, 26c, respectively.

In operation, the secondary 105 of the transformer supplies alternating current to rectifier 106 which in turn provides a substantially constant direct current potential for the anodes of the cathode follower and amplifier tube 110 through its cathode 107b, and for anodes 135 and 136 of the temperature limited diodes 127 and 128 through its cathode 107a. Through the anode 111a, grid 112a and cathode 113a a substantially constant direct current potential of positive sign is applied to the biasing transformer at its center point 38. Through the secondary 120 a variable filament voltage is applied to the temperature limited diodes, varying with variations in the output voltage of the alternator, and through the rectifying action of the diodes, a variable direct current potential is developed and made effective upon the grid 112b. This in turn controls the flow of current to the cathode 113b and provides for developing a biasing direct current potential of positive sign which is applied directly to the cathodes of the rectifier tubes 20a, 20b and 20c. The application of a positive direct current bias to the cathodes of the rectifier tubes is however equivalent to applying a negative bias to the point 38 of the bias transformer, and hence the grids of the rectifier tubes are again subjected to a composite potential which is made up of an alternating current potential in quadrature relation with the source, a substantially constant direct current potential, and an opposing direct current potential which is variable in relation to the variations of the output voltage in the main alternator. As described above, the value of the constant direct current potential is preferably such that at all times the control grids 25a, 25b and 25c remain positive, and are not rendered negative in the absence of the opposing direct current potential.

Parallel operation of a plurality of such alternators is accomplished in the manner already described, namely, through the use of the current transformer 95 connected to equalizer line 97 and coupled to the circuit including variable resistor 132 by means of coupling transformer 130 which serves to isolate the equalizer line from the control circuit.

As a specific example of values of resistance and capacity found suitable for use in a system such as that described in Fig. 2, the following table of values is set forth:

| Resistor | Value in ohms |
|---|---|
| 116 | 125,000 |
| 117 | 25,000 |
| 118 | megohm 1 |
| 120 | 25,000 |
| 122 | 100 |
| 123 | 100 |
| 131 | 5 |
| 132 | 25 |
| 142 | 5,000 |
| 143 | 25,000 |
| 145 | 25,000 |
| 153 | 15,000 |
| 165 | |

| Condenser | Value in microfarads |
|---|---|
| 114 | 0.05 |
| 115 | 0.05 |
| 147 | 0.05 |
| 151 | 0.002 |
| 152 | 0.05 |

Figure 3:
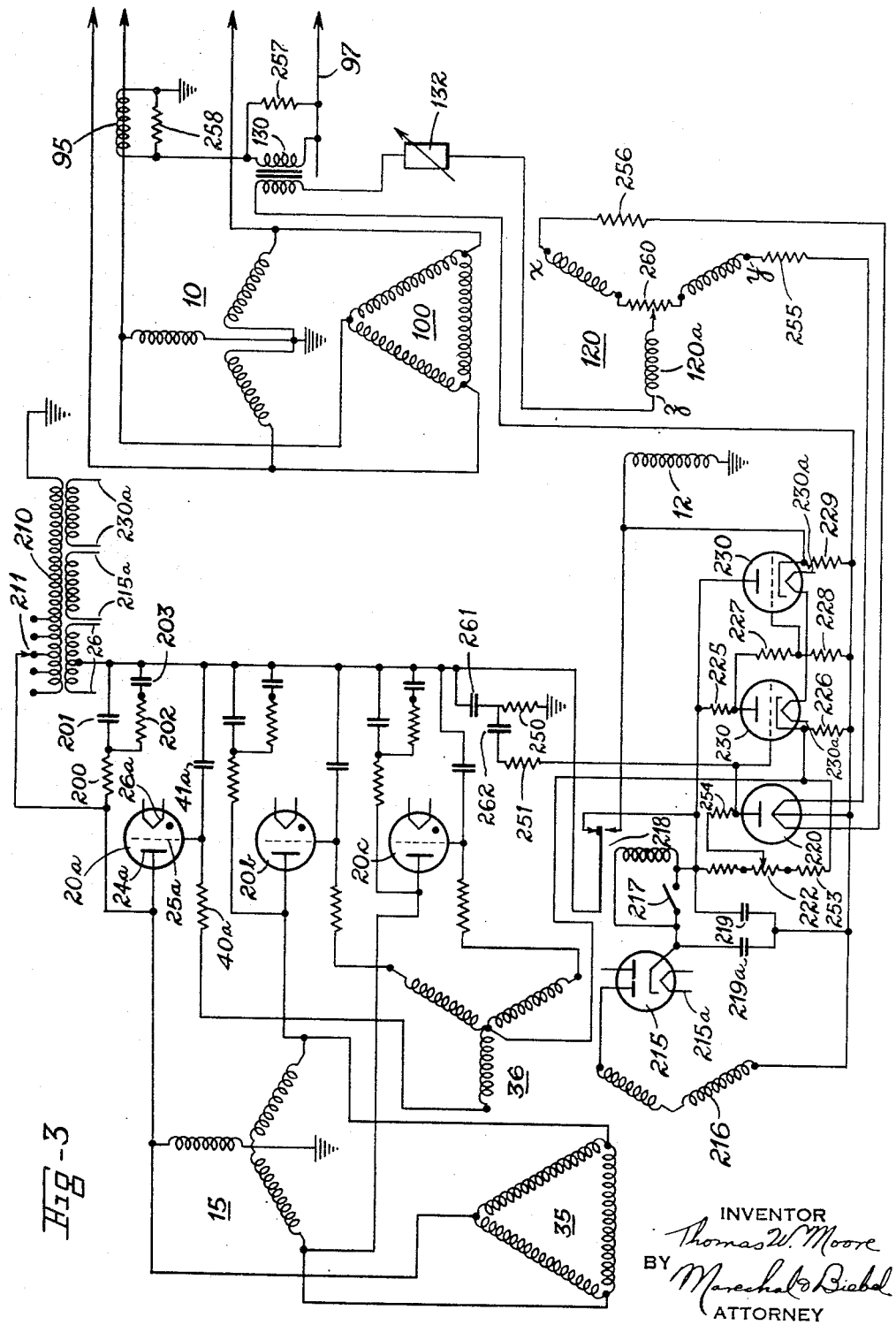
Fig. 3 is a diagrammatic view of a further modification.

The form of the regulator shown in Fig. 3 includes several modifications, similar elements being similarly designated and not requiring additional detailed description.

Tests indicate the desirability of a dual section buffer in the form of an R. C. network 200—203 connected in the circuit of each of the rectifier tubes 20a, 20b and 20c, as shown, since the desired performance is gained in this way with less energy expenditure. The quadrature bias and sensing voltages are shown as derived from a delta-star transformation 35, 36 since this secures identical results with fewer terminals on the transformer although either this arrangement or that shown in Figs. 1 and 2 may be used.

For applications where the speed is to be held to close limits, tests indicate that the inherent regulation of the permanent magnet generator is adequate for filament supply. Accordingly, the filament transformer 210 is supplied with primary taps 211 for proper matching to the particular machine to be used, allowing thereby for minor differences in the developed voltage of different permanent magnet machines. This permits dispensing with the filament change-over relay as previously described. The several secondaries are marked to correspond with the several cathode heating circuits which they supply.

The rectifier tube 215 for the plate or anode supply is shown as a 6X4 replacing the 6AL5 tube 106 in Fig. 2 since with the circuit in Fig. 3 only one power circuit is necessary and the additional plate circuit provides for operation of safety controls which may be utilized if desired when integrating with the speed control of the prime mover. It is supplied from two legs of another secondary winding 216 energized by primary 35. A single pole single throw switch 217 in the cathode circuit of the tube controls the starting and stopping of the power supply through relay 218, the switch 217 being in parallel with the relay winding and thus being in open position to start and in closed position to stop. Condensers 219 and 219a respectively are connected as shown in circuit with the cathode and control switch.

The temperature sensitive elements are shown as both enclosed in a single tube 220 such as on SR–1146 duo-diode replacing the two X6030 tubes 135 shown in Fig. 2. The two filament sections are sufficiently close to each other to cause some energy interchange. This is a desirable feature since it causes less change in the regulated voltage due to an unbalance in active components of current between two alternators.

The circuit connections are such that some series compensation is gained by utilizing the voltage droop of the permanent magnet machine as the load is applied. The amount of series compensation used is adjusted by resistor 222 which permits control under stable conditions ranging from a 2% droop at one extreme to a 2% voltage increase with load at the other extreme. In the intermediate setting the regulation is isochronous within about ¼ of 1%.

The connections including resistors 225 to 229 inclusive cause the first half of the 12AT7 tube 230 to function as an amplifier as well as cathode follower. The second section tube 230 functions as a cathode follower as in Fig. 2 to reduce the effective impedance of the voltage sensing circuit as applied to the thyratron grids. The cathodes of the two halves of the tube 230 are connected in series.

Relay 218 is used for a field switch. Due to the rather high D. C. voltage (250 volts) and current (up to 15 amperes) an ordinary field switch for high altitude use would be excessively large and would require a very large contact opening. In the circuit arrangement shown, relay 218 is so arranged that the top contact closes before the bottom one opens. Under this condition the closing of the top contact causes the cathodes of the rectifier tubes 20a, 20b and 20c to go highly positive, thereby biasing the grids past cut-off. The circuit is thereby broken by the thyratrons while being mechanically disconnected by the contacts of the relay. Thereafter the current cannot be re-established until the contacts are closed to the field winding 12 and the controls are functioning on the thyratrons. Since the relay carries the full plate currents of the amplifier, a low speed, low voltage, weak rectifier, defective amplifier, or open filament in either tube will not permit the relay to close. If one section of the filament of tube 230 is out of order, the series connection will automatically prevent the rest of the tube operating. Thus relay 218 serves as a field switch and takes care of most of the likely causes of failure.

Parallel operation of any desired number of alternators may be accomplished by circuit connections as shown in Fig. 3 which are generally similar to those already described. The detailed function of the load division network may be explained as follows.

When any two or more alternators are connected in parallel, the sharing of the active component of the load will be dependent upon the load carrying characteristics of the prime movers and upon the fuel-governing mechanism. Any change in real load appears as a change in fuel consumption. Any difference in the generated voltage of the machines will cause a local circulating current to flow. The sharing of the reactive load is dependent upon proper adjustment of the field currents of the respective alternators, in order to control the magnitude of the circulating current. It is therefore necessary to devise a means whereby an unbalance in the reactive load division between two or more machines will react upon the various machines through their voltage sensing networks in such a manner as to restore balance. At the same time the circuits should be such as to reject any signals arising from improper division of active load.

Referring to the circuit diagram in Fig. 3, it will be noticed that a 90° transformation takes place between primary 100 and secondary 120 of the voltage sensing transformer. Therefore, potentials arising from coupling transformer 130 due to an unbalanced active component of current in the load line from the terminal to which current transformer 95 is connected will be in quadrature with the voltage on leg 120a. For the same reason, voltages produced by a reactive unbalance will be either in phase addition or direct phase difference with such voltage on leg 120a.

The system of the present invention provides for the parallel operation of a plurality of alternators by producing a potential for each machine proportional to its output current and producing from such potential for each machine a derived potential having a phase and magnitude depending upon the difference between the potential for that machine and the average potential of all other machines in the parallel system, such derived potential being superimposed upon the voltage sensing circuit of the regulator for such machine in such manner as to control the output and stabilize the parallel operation of the system.

Fig. 4 is a vector diagram illustrating the voltage conditions occurring at the three terminals x, y and z of sensing transformer 120. As point z on Fig. 4 moves to the right, the increase in the length of vector y—z is largely compensated for by a corresponding reduction in vector x—z. However, any vertical movement of point z affects both y—z and x—z equally. The double diode SR–1146 tube 220 is so connected that one leg of its center connected filament is used for sensing each of the vectors y—z and x—z. Accordingly, the only vector addition that will affect the diode filaments will be one which causes a vertical movement of point z. This vertical movement of point z (Fig. 4), as explained before, can arise only through an unbalance in the reactive load division resulting in a potential change as described above. It will be understood that this same arrangement could be used in other applications for sensing active load by dispensing with the 90° transformation of the star-delta transformer.

This type of load division network has an advantage over the more usual series connected or "ring circuit" network in that any number of machines can be paralleled on a line without requiring any changes in the established connections or adjustments of those machines already operating.

Suitable constants for the circuit of Fig. 3, other than those already described may be as follows:

| Resistor | Resistance in ohms |
|---|---|
| 200 | 5 |
| 202 | 200 |
| 40a | 0.22 megohm |
| 250 | 0.1 megohm |
| 251 | 0.1 megohm |
| 252 | 12,000 |
| 253 | 12,000 |
| 254 | 1.5 megohm |
| 225 | 0.5 megohm |
| 226 | 12,000 |
| 227 | 1.5 megohm |
| 228 | 1.0 megohm |
| 229 | 30,000 |
| 255 | 50 |
| 256 | 50 |
| 257 | 5 |
| 258 | 15 |
| 222 | 10,000 |
| 260 | 10 |
| 132 | 20 |

| Condenser | Value in microfarads |
|---|---|
| 201 | 0.2 |
| 203 | 0.1 |
| 41a | 0.0003 |
| 261 | 0.1 |
| 262 | 0.02 |
| 219 | 0.2 |
| 219a | 0.1 |

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A regulating system for an alternator having an exciting winding adapted to be energized from a separate source of alternating current voltage having permanent magnet excitation which comprises thermionic rectifier means having a control grid forming the sole supply for a controlled flow of direct current from said separate source to said exciting winding, and means for applying to said control grid a control potential having a component in quadrature relation with said alternating current source, a substantially constant direct current component, and a second direct current component of opposite sign to said constant direct current component, and means for varying and amplifying said second direct current component in accordance with variations in the output voltage of said alternator.

2. A regulating system for an alternator having an exciting winding adapted to be supplied from a separate alternating current source having permanent magnet excitation which comprises thermionic rectifying means having an anode connected to said separate source and a control grid and forming the sole supply of current to said winding, means for impressing an alternating current voltage on said grid in quadrature relation with said source, means for deriving an alternating current potential varying in amount with variations in the output voltage of said alternator, means for converting said derived potential into a direct current potential varying in accordance with variations of the output voltage of said alternator, and means for superimposing said varying direct current potential on said grid to control the current flow to said exciting winding to maintain substantially uniform output voltage on said alternator.

3. A regulating system for an alternator having a field winding adapted to be supplied from a separate alternating current source having permanent magnet excitation which comprises thermionic rectifying means having an anode connected to said separate source and a control grid and forming the sole supply of current to said winding, means for deriving from said source an alternating current potential in quadrature relation with said source, means for impressing said quadrature voltage on said grid, means for deriving an alternating current potential varying in amount with variations in the output voltage of said alternator, means for converting said derived potential into a direct current potential varying in accordance with variations of the output voltage of said alternator, and means for superimposing said varying direct current potential on said grid to control the current flow to said field winding to maintain substantially uniform output voltage on said alternator.

4. A regulating system for an alternator having a field winding adapted to be supplied from a separate alternating current source having permanent magnet excitation which comprises thermionic rectifying means having an anode connected to said separate source, a cathode in said field winding circuit and a control grid and forming the sole supply of current to said winding, means for impressing an alternating current potential on said grid in quadrature relation with said source, means for deriving an alternating current potential varying in amount with variations in the output voltage of said alternator, means for segregating said derived potential into a substantially constant voltage portion and a variable voltage portion, varying in accordance with variations of the output voltage of said alternator, means for rectifying both said portions, and means for superimposing both said rectified portions in opposition to each other on said grid to control the current flow to said field winding to maintain substantially uniform output voltage on said alternator.

5. A voltage regulating system for an alternator having a field winding adapted to be supplied from an alternating current source separate from the alternator itself which comprises rectifying means connected in circuit with said separate source and with said winding forming the sole supply of current to said winding, said rectifying means having a control grid, means for applying to said control grid, an alternating current voltage in quadrature relation with said source, means responsive to the output voltage of said alternator for deriving an alternating current voltage varying in accordance with variations in said ouput voltage, means including a non-linear resistance connected to the output of said alternator for developing a direct current potential varying in direct relation with changes in said varying alternating current voltage, and means for superimposing said varying direct current potential on said quadrature voltage to control said grid and to regulate the flow of direct current through said field winding.

6. A voltage regulating system for an alternator having a field winding adapted to be supplied from an alternating current source separate from the alternator itself which comprises rectifying means connected in circuit with said separate source and with said winding forming the sole supply of current to said winding, said rectifying means having a control grid and an anode, means connecting said source to said anode, means for applying to said control grid an alternating current voltage in quadrature relation with said source, means responsive to the output voltage of said alternator for deriving an alternating current voltage varying in accordance with variations in said output voltage, means for developing from said alternating current a substantially constant direct current potential varying in the same sense as an increased amount with changes in said varying alternating current voltage, means for amplifying said varying direct current potential, and means for superimposing said direct current potentials in opposition to each other on said quadrature voltage to control said grid and to regulate the flow of direct current through said field winding.

7. A voltage regulating system for an alternator having a field winding adapted to be supplied from a separate alternating current source having permanent magnet excitation which comprises rectifying means connected in circuit with said separate source and with said winding forming the sole supply of current to said winding, said rectifying means having a control grid, a cathode, and an anode, means connecting said anode to said source and connecting said cathode to said field winding, means for applying to said control grid an alternating current voltage in quadrature relation with said source, means responsive to the output voltage of said alternator for deriving an alternating current voltage varying in accordance with variations in said output voltage, means including a nonlinear resistance connected to the output of said alternator for developing a direct current potential varying in direct relation with changes in said varying alternating current voltage, means for developing a substantially constant direct current potential, and means for imposing both said direct currnet potentials in opposition to each other on said quadrature voltage to control said grid and to regulate the current flow to said field winding.

8. A voltage regulating system for maintaining division of the reactive load among a plurality of alternating current generating units operating in parallel each of which includes an alternator having an exciting winding adapted to be supplied from a regulatable source of power which comprises an equalizer line connected to a corresponding circuit of the output of each alternator, an impedance in each said equalizer line circuit for developing a control voltage responsive to the current output of one phase of each said alternator, means for developing a voltage dependent upon the output voltage of the alternator in quadrature relation with said one phase, and sensing means responsive to the vector sum of said control voltage and said quadrature voltage for regulating said power source to vary the excitation on the alternator associated therewith to maintain predetermined division of the reactive load among said alternators.

9. A voltage regulating system comprising a plurality of generating units each including an exciter alternator, means for rectifying the output of said exciter alternator to produce a controlled supply of direct current therefrom, a main alternator having an exciter winding, and means for supplying said direct current to said exciting winding, in combination with an equalizer line connected to a corresponding circuit of the output of each alternator, an impedance in each said equalizer line circuit for developing a control voltage responsive to the current output of one phase of each said alternator, means for developing a voltage dependent upon the output voltage of the alternator in quadrature relation with said one phase, and sensing means responsive to the vector sum of said control voltage and said quadrature voltage for regulating said direct current supply and controlling the excitation of each of the main alternators for maintaining predetermined reactive load division among said main alternators.

10. A voltage regulating system comprising a plurality of generating units each including a permanent magnet exciter alternator, means for rectifying the output of said exciter alternator to produce a controlled supply of direct current therefrom, a main alternator having an exciter winding, and means for supplying said direct current to said exciting winding, in combination with an equalizer line connected to a corresponding circuit of the output of each alternator, an impedance in each said equalizer line circuit for developing a control voltage responsive to the current output of one phase of each said alternator, means for developing a voltage dependent upon the output voltage of the alternator in quadrature relation with said one phase, and sensing means responsive to the vector sum of said control voltage and said quadrature voltage for regulating said direct current supply and controlling the excitation of each of the main alternators for maintaining predetermined reactive load division among said main alternators.

11. A voltage regulating system comprising a plurality of generating units each including an exciter alternator, thermionic means for rectifying the output of said exciter alternator to produce a controlled supply of direct current therefrom, a main alternator having an exciter winding, and means for supplying said direct current to said exciting winding, in combination with an open circuit equalizer line connected to a corresponding circuit of the output of each alternator, an impedance in each said equalizer line circuit for developing a control voltage responsive to the current output of one phase of each said alternator, means for developing a voltage dependent upon the output voltage of the alternator in quadrature relation with said one phase, and sensing means responsive respectively to the vector sum of said control voltages and said quadrature voltages for regulating each said thermionic means to vary the excitation and control the output of each of the main alternators to maintain predetermined reactive load division among said main alternators.

12. A voltage regulating system as defined in claim 11 in which said exciter is a permanent magnet polyphase alternator.

References Cited in the file of this patent

UNITED STATES PATENTS

| | | |
|---|---|---|
| 2,217,473 | Exner | Oct. 8, 1940 |
| 2,239,432 | Stratton | Apr. 22, 1941 |
| 2,504,878 | Reilly | Apr. 18, 1950 |